United States Patent [19]

Aonuma

[11] Patent Number: 4,897,446

[45] Date of Patent: Jan. 30, 1990

[54] RUBBER COMPOSITIONS

[75] Inventor: Mitsuyoshi Aonuma, Tokyo, Japan

[73] Assignee: Nippon Zeon Co., Ltd., Tokyo, Japan

[21] Appl. No.: 251,889

[22] Filed: Sep. 30, 1988

[30] Foreign Application Priority Data

Oct. 1, 1987 [JP] Japan ................................. 62-249030
Oct. 1, 1987 [JP] Japan ................................. 62-249031

[51] Int. Cl.⁴ ........................ C08L 51/04; C08L 51/08
[52] U.S. Cl. ...................................... 525/64; 525/187
[58] Field of Search ........................... 525/64, 187, 285

[56] References Cited

U.S. PATENT DOCUMENTS

| | | | |
|---|---|---|---|
| 3,033,832 | 5/1962 | Serniuk | 525/285 |
| 3,586,087 | 6/1971 | Messerly | 525/187 |
| 3,649,715 | 3/1972 | Oetzel | 525/187 |
| 4,112,020 | 9/1978 | Callan | 525/64 |
| 4,591,617 | 5/1986 | Berta | 525/187 |

*Primary Examiner*—Lewis T. Jacobs
*Assistant Examiner*—David Buttner
*Attorney, Agent, or Firm*—Sherman and Shalloway

[57] ABSTRACT

A rubber composition comprising
(1) 10 to 90% by weight of at least one of a butyl rubber and a halogenated butyl rubber as a first rubber component, and
(2) 90 to 10% by weight of an epichlorohydrin rubber as a second rubber component,
at least part of at least one of said rubbers (1) and (2) being modified with maleic anhydride or its derivative.

5 Claims, No Drawings

RUBBER COMPOSITIONS

This invention relates to a rubber composition. More specifically, this invention relates to a rubber composition comprising a butyl rubber and/or a halogenated butyl rubrrer and an epichlorohydrin rubber and having improved mechanical properties.

A butyl rubber and a halogenated butyl rubber have been so far known as rubbers having excellent gas barrier property and excellent antivibration characteristics. However, owing to poor oil resistance, said rubbers have not been applied to oil-resistance rubber products used in contact with various oils. Moreover an epichlorohydrin rubber is a rubber having excellent oil resistance and good gas barrier property, but insufficient in performance when used in products requiring high gas barrier property.

As the levels in various industrial fields have been raised in recent years, oil-resistant rubbers having excellent gas barrier property and antivibration characteristics have been demanded as substrate materials. To achieve such purposes, there are a method for developing new rubbers, a method for blending rubbers, and an improving method by compounding. However, the method for developing new rubbers usually takes much time and the improving method by compoundign is limited in developing properties.

The butyl rubber or the halogenated butyl rubber has not been to date blended with the epichlorohydrin rubber because the butyl rubber or the halogenated butyl rubber and the epichlorohydrin rubber are poor in compatibility and dispersibility and are hard to covulcanize. Accordingly, in some co-vulcanization method which is usually performed in the rubber industry, a blend rubber vulcanizate of a butyl rubber or a halogenated butyl rubber and an epichlorohydrin rubber suffers a defect that as their blending ratios are closer to equal volumes, the mechanical properties are decreased, and the improvement thereof has been demanded.

It is an object of this invention to provide a rubber composition comprising a blend of a butyl rubber and/or a halogenated butyl rubber and an epichlorohydrin rubber which can be co-vulcanized and have excellent vulcanizing properties (mechanical properties).

The present inventors have made extensive studies to achieve this object, and consequently found that a composition obtained by adding to a blend of (1) a butyl rubber and/or a halogenated butyl rubber and (2) an epichlorohydrin rubber a substance obtained by modifying one or both of the rubber components (1) and (2) with maleic anhydride or its derivative develops excellent mechanical properties and that the composition containing one of the rubber components (1) and (2) as crosslinked rubber particles exhibits still better mechanical properties.

This invention thus provides a rubber composition comprising (1) 10 to 90% by weight of a butyl rubber and a halogenated butyl rubber as a first rubber component and (2) 90 to 10% by weight of an epichlorohydrin rubber as a second rubber component, at least part of at least one of said rubbers (1) and (2) being modified with maleic anhydride or its derivative.

The butyl rubber used as the first rubber component in this invention is an isobutylene-isoprene copolymer rubber (IIR) having usually a degree of saturation of 0.5 to 2.5 mol %. The halogenated butyl rubber is a chlorinated butyl rubber (ClIR) or a brominated butyl rubber (BrIIR) obtained by chlorinating or brominating the butyl rubber. The degree of halogenation of these rubbers is not particularly limited.

Examples of the epichlorohydrin rubber as the second rubber component in this invention are an epichlorohydrin homopolymer rubber (CO), an epichlorohydrinethylene oxide copolymer rubber (ECO), an epichlorohydrinallylglycidyl ether copolymer rubber, an epichlorohydrinethylene oxide-allylglycidyl ether three-component copolymer rubber (ETCO), an epichlorohydrin-propylene oxide-allylglycidyl ether three-component copolymer rubber, and blends of these rubbers and liquid copolymer rubbers of the above compositions having a number-average molecular weight of not more than 10,000.

The butyl rubber, the halogenated butyl rubber or the epichlorohydrin rubber modified with maleic anhydride or its derivative which is used in this invention can be obtained by modifying the unmodified rubber with maleic anhydride or its derivative directly with heat at high temperatures or by modifying it in the presence of a radical generator. The direct heat modifying method and the radical modifying method are that the butyl rubber, the halogenated butyl rubber or the epichlorohydrin rubber is heated in an inert solvent that dissolves them or the mixture of said polyemr rubber and maleic anhydride or its derivative is heated for modification. The modification reaction in a solution can be performed with a chemical reaction vessel, and the modification reaction in a solid phase with mixing and processing machines such as a closed kneader, a kneading extruder, rolls, etc.

Examples of maleic anhydride and its derivative used in this invention are maleic anhydride; maleic acid; monoalkyl maleates such as monomethyl maleate, monoethyl maleate, monobutyl maleate and mono-2-ethylhexyl maleate; and maleimides such as maleimide and N-hydroxyethyl maleimide.

In this invention, an amount of the butyl rubber, the halogenated butyl rubber or the epichlorohydrin rubber modified with maleic anhydride or its derivative (an amount of maleic anhydride or its derivative bound to said rubber) is not particularly limited; however, maleic anhydride or its derivative is not less than $1 \times 10^{-3}$ mol equivalent/100 g of the rubber. In this invention, a molecular weight of the modified rubber is not particularly limited. Preferably, a weight-average molecular weight is not less than 3,000.

In this invention, it is necessary that at least part of at least one of the first and second rubber compositions is modified with maleic anhydride or its derivative. The content of such modified rubber is not less than 1% by weight, preferably not less than 2% by weight based on the total weight of the rubber components.

Accordingly, the rubber composition of this invention comprises 10 to 90% by weight of the first rubber composition and 90 to 10% by weight of the second rubber composition, provided at least part (i.e. an amount corresponding to at least 1% by weight based on the total weight of the rubber components) of at least one of the first and second rubber components is modified as above. Where the first rubber component is less than 10% by weight and the second rubber component is more than 90% by weight, or where the first rubber component is more than 90% by weight and the second rubber component is less than 10% by weight, excellent properties, e.g. improved balanced properties, i.e. gas barrier property and oil resistance provided by the first and second rubber components are not obtained, and characteristics of the blend rubber are not gained. The preferable proportions of the first and second rubber components are 20 to 80% by weight and 80 to 20% by weight respectively.

The rubber composition of this invention is characterized in that at least part of the first rubber component and/or the second rubber component is modified with maleic anhydride or its derivative, thereby making it possible to give the vulcanizate the excellent mechanical properties. Types and amounts of a vulcanizing agent, a vulcanization accelerator and an activator are not particularly limited. Those commonly used in the rubber industry are available. Preferable examples thereof are metallic oxides such as zinc oxide and magnesium oxide, sulfur-type vulcanizing agents such as sulfur, tetramethylthiuram disulfide and morpholine disulfide, quinoil-type vulcanizing agents such as p-quinone dioxime and p,p′-dibenzoylquinone dioxime, methylol phenol-type vulcanizing agents such as dimethylolphenol derivatives, alkylphenol disulfide-type vulcanizing agents such as N,N′-dimethyl-N,N′-diphenylthiruam disulfide, thiourea-type vulcanizing agents such as 2-mercaptoimidazoline, triazinethiol-type vulcanizing agents such as 2,4,6-trimercapto-S-traizine and 2-dimethylamino-4,6-dithiol-S-triazine, amine-type vulcanizing agents such as triethanolamine and hexamethylenetetramine, polyfunctional epoxide compounds such as ethylene glycol diglycidyl ether, polyfunctional isocyanate compounds such as diphenylmethane diisocyanate and polyfunctional hydroxy compounds such as hydroquinone. They are used either singly or in combination.

The rubber composition of this invention can further improve in mechanical properties by containing one of the first and second rubber components as crosslinked rubber particles [this composition is hereinafter called a "rubber composition (better mode)"]. Te content of the crosslinked rubber particles is not more than 80% by volume based on the total volume of the rubber components. When it exceeds 80% by volume, processability becomes notably poor, deviating from the object of this invention. It is preferably not more than 70% by volume.

In the rubber composition (better mode), a dispersion particle size, a particle shape and a dispersion mode of crosslinked rubber particles and a degree of crosslinking of dispersed particles are not particularly limited. It is advisable that the dispersed particle size is not more than 5 microns, the degree of crosslinking of dispersed particles is not less than 95% as a gel content and the dispersed particles do not form an agglomerate in the other rubber component phase. The gel content of the rubber is a volume percentage of an insoluble matter which is not dissolved in a solvent that dissolves one of the rubber components forming the crosslinked particles but not the other rubber component, or a volume percentage of the insoluble matter in the one rubber component forming the crosslinked particles, which is found by separating the one rubber component forming the crosslinked particles from the soluble rubber matter dissolved in a solvent that solves both the rubber components, determining and calculating its volume.

The rubber composition (better mode) can be produced by a method wherein the powder of the one crosslinked rubber component is blended with the mass of the other uncrosslinked rubber component, a method wherein the one crosslinked rubber component latex is blended with the other uncrosslinked rubber component latex, followed by dehydration and drying, or a method wherein the one rubber component is dynamically vulcanized in the presence of the other rubber component. As a method for blending the crosslinked rubber powder, there is a method wherein a crosslinked rubber powder obtained by vulcanizing the one rubber component under kneading or a crosslinked rubber powder obtained from an emulsion or a suspension of the one crosslinked rubber component is blended wth the mass of the other uncrosslinked rubber component by kneading.

The dynamic vulcanization method is that the one rubber component and the other rubber component are vulcanized during kneading with a vulcanizing agent that vulcanizes the one rubber component but not the other rubber component. This is a most preferable method to produce the ruubber composition (better mode). The dynamic vulcanization can be carried out by a closed kneader or a kneading/extrusion-molding machine used in ordinary kneading and mixing, such as a Banbury mixer, a Brabender mixer or a kneader. Above all, a kneader of a high shear force is effective for minimizing a particle size of dispersed particles of a crosslinked rubber, and is desirous in providing excellent properties. In the dynamic vulcanization, it is required that the one rubber component alone is vulcanized and the other rubber component is not.

The dynamic vulcanizing agent is not particularly limited. Vulcanizing agents commonly used in the butyl rubber, the halogenated butyl rubber and the epichlorohydrin rubber are available as the dynamic vulcanizing agent. Preferably, sulfur-type vulcanizing agents, quinoid-type vulcanizing agents, methylolphenol resin-type vulcanizing agents and alkylphenol disulfidetype vulcanizing agents are available in dynamically vulcanizing the butyl rubber or the halogenated butyl rubber, and triazinethiol-type vulcanizing agents, thiourea-type vulcanizing agents and amine-type vulcanizing agents are available in dynamically vulcanizing the epichlorohydrin rubber. These vulcanizing agents may be usually added to the rubber during kneading or mixed in advance with the rubber being dynamically vulcanized. Said rubber component is dispersed in the other rubber component as crosslinked rubber particles by conducting vulcanization during kneading upon setting the vulcanization temperature of the rubber component being dynamically vulcanized.

The rubber composition of this invention is mixed with compounding ingredients by an ordinary mixing machine and molded into a given shape by an ordinary rubber molding machine such as rolls, a press molding machine, an extrusion molding machine or an injection molding machine. The compounding ingredients are those commonly used in the customary rubber industry, such as vulcanizing agents, reinforcing agents, fillers, plasticizers, softening agents, processing aids and antioxidants. Their types and amounts are properly determined depending on the use purpose of the rubber composition.

This invention thus provides a rubber composition having much improved mechanical properties and good processability and moldabiltiy in comparison to the ordinary rubber composition obtained from the butyl rubber and/or the halogenated butyl rubber and the epichlorohydrin rubber.

The rubber composition of this invention is suitable for producing, by molding and vulcanization, tire tubves, hoses, seals, gaskets, belts, boots, rolls and various rubber products requiring gas barrier property to various gaseous substances. It is also useful to produce various products by blending with polyamide resins and polyester resins.

The following Examples and Comparative Examples illustrate this invention more specifically. Parts and percentages in said Examples and Comparative Examples are on the weight basis unless otherwise indicated.

EXAMPLES 1-3 AND COMPARATIVE EXAMPLES 1-3

A rubber blend obtained by mixing 100 parts of a butyl rubber plus a modified butyl rubber, 60 parts of SRF carbon black, 3 parts of zinc oxide, 2 parts of tetramethylthiuram disulfide and 2 parts of sulfur with low-temperature rolls, and a rubber blend obtained by mixing 100 parts of an epichlorohydrin homopolymer, 60 parts of SRF carbon black, 3 parts of magnesium oxide, 1 part of 2,4,6-trimercapto-S-triazine, 0.5 part of diphenylguanidine and 4 parts of polyoxypropylenediamine with low-temperature rolls were mixed low-temperature rolls according to a formulation shown in Table 1. The resulting rubber composition was press-vulcanized at 160° C. for 30 minutes to obtain a vulcanizate.

EXAMPLE 4

A rubber blend composition was prepared and a vulcanizate was obtained in the same way as in Examples 1-3 except using a liquid epichlorohydrin homopolymer rubber together with the epichlorohydrin homopolymer rubber.

EXAMPLE 5 AND COMPARATIVE EXAMPLE 4

In Example 5, a rubber blend composition was prepared and a vulcanizate was obtained as in said Examples except using a butyl rubber, a chlorinated butyl rubber and a modified chlorinated butyl rubber instead of the butyl rubber and the chlorinated butyl rubber.

In Comparative Example 4, a rubber blend composition was prepared and a vulcanizate was obtained in the same way as in said Comparative Examples except using a butyl rubber and a chlorinated butyl rubber instead of the butyl rubber.

EXAMPLES 6-8 AND COMPARATIVE EXAMPLES 5-6

A rubber blend obtained by mixing 100 parts of a chlorinated butyl rubber, 60 parts of SRF carbon black, 3 parts of zinc oxide, 4 parts of a methylolated alkylphenol formaldehyde, 0.6 part of tetramethylthiuram disulfide and 0.4 part of sulfur with low-temperature rolls, and a rubber blend obtained by mixing 100 parts of an epichlorohydrin-ethylene oxide-allylglycidyl ether three-component copolymer rubber plus a modified epichlorohydrin homopolymer rubber, 60 parts of SRF carbon black, 3 parts of magnesium oxide and 1 part of 2,4,6-trimercapto-S-triazine with low-temperature rolls were mixed with low-temperature rolls according to a formulation shown in Table 1. The resulting rubber composition was press-vulcanized at 160° C. for 30 minutes to obtain a vulcanizate.

EXAMPLE 9

A vulcanizate was obtained as in said Examples except using the modified epichlorohydrin homopolymer alone as an epichlorohydrin rubber.

The vulcanizates obtained in said Examples and Comparative Examples were subjected to a tensile test according to JIS K 6301. The results are shown in Table 1.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Formulation (parts by weight) | Butyl rubber (*1) | 81 | 45 | 9 | 45 | 25 | | | | |
| | Chlorinated butyl rubber (*2) | | | | | 20 | 50 | 30 | 30 | 50 |
| | Modified butyl rubber (*3) | 9 | 5 | 1 | 5 | | | | | |
| | Modified chlorinated butyl rubber (*4) | | | | | 5 | | | | |
| | Epichlorohydrin homopolymer rubber (*5) | 10 | 50 | 90 | 45 | 50 | | | | |
| | Epichlorohydrin-ethylene oxide copolymer rubber (*6) | | | | | | | | | |
| | Allylglycidyl ether three-component copolymer rubber | | | | | | 45 | 63 | 53 | |
| | Liquid epichlorohydrin homopolymer rubber (*7) | | | | 5 | | | | | |
| | Modified epichlorohydrin homopolymer rubber (*8) | | | | | | 5 | 7 | 17 | 50 |
| | SRF carbon black | 60 | 60 | 60 | 60 | 60 | 60 | 60 | 60 | 60 |
| | Zinc oxide | 2.7 | 1.5 | 0.3 | 1.5 | 1.5 | 1.5 | 0.9 | 0.9 | 1.5 |
| | Magnesium oxide | 0.3 | 1.5 | 2.7 | 1.5 | 1.5 | 1.5 | 2.1 | 2.1 | 1.5 |
| | 2,4,6-trimercapto-S—triazine | 0.1 | 0.5 | 0.9 | 0.5 | 0.5 | 0.5 | 0.7 | 0.7 | 0.5 |
| | Diphenylguanidine | 0.05 | 0.25 | 0.45 | 0.25 | 0.25 | | | | |
| | Polyoxypropylenediamine (*9) | 0.4 | 2.0 | 3.6 | 2.0 | 2.0 | | | | |
| | Methylolated alkylphenol formaldehyde resin (*10) | | | | | | 2.0 | 2.8 | 2.8 | 2.0 |
| | Tetramethylthiuram disulfide | 1.8 | 1.0 | 0.2 | 1.0 | 1.0 | 0.30 | 0.18 | 0.18 | 0.30 |
| | Sulfur | 1.8 | 1.0 | 0.2 | 1.0 | 1.0 | 0.20 | 0.12 | 0.12 | 0.20 |
| Test results | Tensile tests | | | | | | | | | |
| | Tensile strength (kg/cm$^2$) | 111 | 101 | 119 | 97 | 89 | 117 | 116 | 105 | 98 |
| | Elongation (%) | 380 | 320 | 340 | 300 | 290 | 330 | 350 | 360 | 370 |
| | 100% Stress (kg/cm$^2$) | 27 | 28 | 28 | 29 | 26 | 29 | 28 | 25 | 23 |
| | Hardness (JIS) | 67 | 68 | 69 | 70 | 66 | 71 | 70 | 67 | 63 |

| | | Comparative Examples | | | | | |
|---|---|---|---|---|---|---|---|
| | | 1 | 2 | 3 | 4 | 5 | 6 |
| Formulation (parts by weight) | Butyl rubber (*1) | 90 | 50 | 10 | 25 | | |
| | Chlorinated butyl rubber (*2) | | | | 25 | 50 | 30 |
| | Modified butyl rubber (*3) | | | | | | |

TABLE 1-continued

| | | | | | | |
|---|---|---|---|---|---|---|
| Modified chlorinated butyl rubber (*4) | | | | | | |
| Epichlorohydrin homopolymer rubber (*5) | 10 | 50 | 90 | 50 | | |
| Epichlorohydrin-ethylene oxide copolymer rubber (*6) | | | | | | |
| Allylglycidyl ether three-component copolymer rubber | | | | | 50 | 70 |
| Liquid epichlorohydrin homopolymer rubber (*7) | | | | | | |
| Modified epichlorohydrin homopolymer rubber (*8) | | | | | | |
| SRF carbon black | 60 | 60 | 60 | 60 | 60 | 60 |
| Zinc oxide | 2.7 | 1.5 | 0.3 | 1.5 | 1.5 | 0.9 |
| Magnesium oxide | 0.3 | 1.5 | 2.7 | 1.5 | 1.5 | 2.1 |
| 2,4,6-trimercapto-S—triazine | 0.1 | 0.5 | 0.9 | 0.5 | 0.5 | 0.7 |
| Diphenylguanidine | 0.05 | 0.25 | 0.45 | 0.25 | | |
| Polyoxypropylenediamine (*9) | 0.4 | 2.0 | 3.6 | 2.0 | | |
| Methylolated alkylphenol formaldehyde resin (*10) | | | | | 2.0 | 2.8 |
| Tetramethylthiuram disulfide | 1.8 | 1.0 | 0.2 | 1.0 | 0.30 | 0.18 |
| Sulfur | 1.8 | 1.0 | 0.2 | 1.0 | 0.20 | 0.12 |
| Test results — Tensile tests | | | | | | |
| Tensile strength (kg/cm$^2$) | 81 | 59 | 86 | 54 | 72 | 77 |
| Elongation (%) | 340 | 230 | 320 | 210 | 250 | 270 |
| 100% Stress (kg/cm$^2$) | 26 | 25 | 28 | 24 | 26 | 27 |
| Hardness (JIS) | 67 | 65 | 69 | 64 | 66 | 67 |

(Notes)

(*1) "BUTYL 268": a tradename for a product made by Exxon K.K.

(*2) "CHLOROBUTYL 1066": a tradename for a product made by Exxon K.K.

(*3) Hundred parts of "BUTYL 268" and 2 parts of maleic anhydride were charged into a Brabender mixer and kneaded at 180° C. and 80 rpm for 10 minutes. Subsequently, 0.1 part of 2.5-dimethyl-2,5-di(t-butylperoxy)hexine-3 ("PERHEXA 25B-40": a tradename for a product made by Nippon Oils & Fats Co., Ltd.) was charged, and the mixture was kneaded for 10 minutes and discharged. An equivalent of bound acid of the resulting modified butyl rubber was $3.6 \times 10^{-2}$ mol equivalent/100 g of the rubber. A specific gravity was 0.94 g/cm$^3$.

(*4) Hundred parts of "CHLOROBUTYL 1066" and 5 parts of maleic acid were charged into a Brabender mixer, and a modified chlorinated butyl rubber was obtained in the same formulation as the above modified butyl rubber. An equivalent of bound acid of the resulting butyl rubber was $1.5 \times 10^{-2}$ mol equivalent/100 g of the rubber.

(*5) "GECHRON 1000": a tradename for a product made by Nippon Zeon Co., Ltd.

(*6) "GECHRON 3103": a tradename for a product made by Nippon Zeon Co., Ltd.

(*7) "HYDRIN 10 × 2": a tradename for a product made by Goodrich Chemical K.K., having a number-average molecular weight of 3400.

(*8) Hundred parts of "GECHRON 1000" and 3 parts of maleic anhydride were charged into a Brabender mixer and kneaded at 150° C. and 80 rpm for 5 minutes. Thereafter 0.1 part of 2,5-dimethyl-2,5-di(t-butylperoxy)hexine-3 was charged, and the mixture was kneaded for 30 minutes and discharged. An equivalent of bound acid of the resulting modified epichlorohydrin homopolymer rubber as $1.1 \times 10^{-2}$ mol equivalent/100 g of the rubber.

(*9) "JEFFERMIN D-2000": a tradename for a product made by Texaco Chemical K.K., having an average degree of polymerization of 33 and an amine value of 520.

(*10) "SP 1045": a tradename for a product made by Schenectady.

Upon comparing Example 1 with Comparative Example 1, Examples 2 & 4 with Comparative Example 2, Example 3 with Comparative Example 3, Example 5 with Comparative Example 4, Examples 6 & 9 with Comparative Example 5, and Examples 7 & 8 with Comparative Example 6, it follows that the rubber compositions of this invention much improve in tensile strength and elongation. In particular, when the blending ratio of the butyl rubber of the chlorinated butyl rubber and the epichlorohydrin rubber is about 1:1, the rubber compositions in Comparative Examples are notably decreased in tensile strength. While in the rubber compositions in Examples the decrease in tensile strength is markedly alleviated, providing a fully practical strength.

EXAMPLES 10–17

In accordance with a formulation shown in Table 2, 100 parts of a butyl rubber plus a modified butyl rubber-1 or -2 was mixed with 40 parts of FEF carbon black with low-temperature rolls to prepare a rubber blend I. Subsequently, 100 parts of an epichlorohydrin homopolymer rubber plus a liquid epichlorohydrin homopolymer rubber or a modified epichlorohydrin rubber was mixed with 40 parts of FEF carbon black, 3 parts of magnesium oxide, 1 part of 2,4,6-trimercapto-S-triazine, 0.5 part of diphenylguanidine and 4 parts of polyoxypropylenediamine by low-temperature rolls to prepare a rubber blend II. Moreover, these rubber blends I and II were mixed in proportions shown in Examples 10–17 in Table 2 by low-temperature rolls to prepare a rubber blend III. The rubber blend III was charged in a Brabender mixer set at 150° C., and dynamically vulcanized at 100 rpm for 30 minutes. After the dynamically vulcanized blend was discharged from the Brabender mixer, it was mixed with zinc oxide, dibenzothiazyl disulfide, tetramethylthiuram disulfide and sulfur in proportions shown in Examples 10–17 in Table 2 through low-temperature rolls. After mixing was finished, the resulting rubber composition was formed into a sheet. On that occasion, a roll processability of the rubber composition was evaluated from a surface smoothness of the sheet.

Subsequently, the sheet was press-vulcanized at 160° C. for 30 minutes, and the resulting vulcanizate was subjected to a tensile test according to JIS K 6301.

The results are shown in Table 2.

COMPARATIVE EXAMPLES 7–11

Rubber blends in Comparative Examples were dynamically vulcanized as in Examples 10–17. The rubber composition in Comparative Example 7 was poor in roll processability and could not be formed into a sheet, so that the properties could not be evaluated. Rubber compositions in Comparative Examples 8–11 were press-vulcanized at 160° C. for 30 minutes, and the properties of the resulting vulcanizates were evaluated. The results are shown in Table 2.

TABLE 2

| | | Examples | | | | | | | |
|---|---|---|---|---|---|---|---|---|---|
| | | 10 | 11 | 12 | 13 | 14 | 15 | 16 | 17 |
| Formulation (parts by weight) | Butyl rubber (*1) | 18 | 45 | 72 | 45 | 45 | 45 | 60 | |
| | Modified butyl rubber-1 (*3) | 2 | 5 | 8 | 5 | | 5 | 20 | |
| | Modified butyl rubber-2 (*11) | | | | | 5 | | | 50 |
| | Epichlorohydrin homopolymer rubber (*5) | 80 | 50 | 20 | 45 | 50 | 45 | 20 | 50 |
| | Liquid epichlorohydrin homopolymer rubber (*7) | | | | 5 | | | | |
| | Liquid epichlorohydrin homopolymer rubber (*12) | | | | | | 5 | | |
| | FEF carbon black | 40 | 40 | 40 | 40 | 40 | 40 | 40 | 40 |
| | Zinc oxide | 0.6 | 1.5 | 2.4 | 1.5 | 1.5 | 1.5 | 2.4 | 1.5 |
| | Magnesium oxide | 2.4 | 1.5 | 0.6 | 1.5 | 1.5 | 1.5 | 0.6 | 1.5 |
| | 2,4,6-trimercapto-S—triazine | 0.8 | 0.5 | 0.2 | 0.5 | 0.5 | 0.5 | 0.2 | 0.5 |
| | Diphenylguanidine | 0.4 | 0.25 | 0.1 | 0.25 | 0.25 | 0.25 | 0.1 | 0.25 |
| | Polyoxypropylenediamine (*9) | 3.2 | 2.0 | 0.8 | 2.0 | 2.0 | 2.0 | 0.8 | 2.0 |
| | Dibenzothiazyl disulfide | 0.2 | 0.5 | 0.8 | 0.5 | 0.5 | 0.5 | 0.8 | 0.5 |
| | Tetramethylthiuram disulfide | 0.2 | 0.5 | 0.8 | 0.5 | 0.5 | 0.5 | 0.8 | 0.5 |
| | Sulfur | 0.4 | 1.0 | 1.6 | 1.0 | 1.0 | 1.0 | 1.6 | 1.0 |
| Ratio of crosslinked rubber particles (% by volume) | | 73.4 | 40.9 | 14.7 | 36.8 | 40.9 | 36.8 | 14.7 | 41.5 |
| Test results | Tensile tests | | | | | | | | |
| | Tensile strength (kg/cm$^2$) | 77 | 122 | 131 | 131 | 108 | 119 | 109 | 110 |
| | Elongation (%) | 250 | 360 | 450 | 410 | 330 | 320 | 490 | 330 |
| | 100% Stress (kg/cm$^2$) | 28 | 29 | 26 | 27 | 28 | 30 | 20 | 28 |
| | Hardness (JIS) | 66 | 66 | 64 | 65 | 65 | 68 | 58 | 64 |
| | Roll processability (surface smoothness of a sheet) | slightly poor | good | good | good | good | good | good | good |

| | | Comparative Examples | | | | |
|---|---|---|---|---|---|---|
| | | 7 | 8 | 9 | 10 | 11 |
| Formulation (parts by weight) | Butyl rubber (*1) | 9 | 20 | 50 | 80 | 50 |
| | Modified butyl rubber-1 (*3) | 1 | | | | |
| | Modified butyl rubber-2 (*11) | | | | | |
| | Epichlorohydrin homopolymer rubber (*5) | 90 | 80 | 50 | 20 | 45 |
| | Liquid epichlorohydrin homopolymer rubber (*7) | | | | | |
| | Liquid epichlorohydrin homopolymer rubber (*12) | | | | | 5 |
| | FEF carbon black | 40 | 40 | 40 | 40 | 40 |
| | Zinc oxide | 0.3 | 0.6 | 1.5 | 2.4 | 1.5 |
| | Magnesium oxide | 2.7 | 2.4 | 1.5 | 0.6 | 1.5 |
| | 2,4,6-trimercapto-S—triazine | 0.9 | 0.8 | 0.5 | 0.2 | 0.5 |
| | Diphenylguanidine | 0.45 | 0.4 | 0.25 | 0.1 | 0.25 |
| | Polyoxypropylenediamine (*9) | 3.6 | 3.2 | 2.0 | 0.8 | 2.0 |
| | Dibenzothiazyl disulfide | 0.1 | 0.2 | 0.5 | 0.8 | 0.5 |
| | Tetramethylthiuram disulfide | 0.1 | 0.2 | 0.5 | 0.8 | 0.5 |
| | Sulfur | 0.2 | 0.4 | 1.0 | 1.6 | 1.0 |
| Ratio of crosslinked rubber particles (% by volume) | | 86.2 | 73.4 | 40.9 | 14.7 | 36.8 |
| Test results | Tensile tests | | | | | |
| | Tensile strength (kg/cm$^2$) | — | 43 | 79 | 92 | 75 |
| | Elongation (%) | — | 160 | 290 | 380 | 280 |
| | 100% Stress (kg/cm$^2$) | — | 26 | 25 | 22 | 23 |
| | Hardness (JIS) | — | 64 | 64 | 62 | 62 |
| | Roll processability | incapable of | heavily | slightly | good | poor |

TABLE 2-continued

| | (surface smoothness of a sheet) | forming a sheet | poor | poor |
|---|---|---|---|---|

(Notes)
(*11) Hundred parts of "BUTYL 268" and 5 parts of maleic anhydride were charged into a Brabender mixer, and a modified butyl rubber-2 was obtained in the same way as the modified butyl rubber-1. An equivalent of bound acid was $1.7 \times 10^{-2}$ mol equivalent/100 g of the rubber. A specific gravity was 0.94 g/cm$^3$.

(*12) Hundred parts of "GECHRON 1000" and 3 parts of maleic anhydride were charged into a Brabender mixer and kneaded at 150° C. and 80 rpm for 5 minutes. Thereafter 0.3 part of 2,5-dimethyl-2,5-di(t-butylperoxy)hexine-3 was charged, and the mixture was kneaded for 30 minutes and discharged. An equivalent of bound acid of the resulting modified epichlorohydrin homopolymer rubber was $1.3 \times 10^{-2}$ mol equivalent/100 g of the rubber. A specific gravity was 1.36 g/cm$^3$.

(Notes)

(*11) Hundred parts of "BUTYL 268" and 5 parts of maleic anhydride were charged into a Brabender mixer, and a modified butyl rubber-2 was obtained in the same way as the modified butyl rubber-1. An equivalent of bound acid was $1.7 \times 10^{-2}$ mol equivalent/100 g of the rubber. A specific gravity was 0.94 g/cm$^3$.

(*12) Hundred parts of "GECHRON 1000" and 3 parts of maleic anhydride were charged into a Brabender mixer and kneaded at 150° C. and 80 rpm for 5 minutes. Thereafter 0.3 part of 2,5-dimethyl-2,5-di(t-butylperoxy)hexine-3 was charged, and the mixture was kneaded for 30 minutes and discharged. An equivalent of bound acid of the resulting modified epichlorohydrin homopolymer rubber was $1.3 \times 10^{-2}$ mol equivalent/100 g of the rubber. A specific gravity was 1.36 g/cm$^3$.

Upon comparing Example 10 with Comparative Example 8, Examples 11, 14, 15 & 17 with Comparative Example 9, Example 13 with Comparative Example 11, and Examples 12 & 16 with Comparative Example 10, it follows that the rubber compositions of this invention have excellent tensile strength and elongation and improved processability.

As shown in Comparative Example 7, when the volume percentage of the dynamically vulcanized crosslinked rubber particles is increased, e.g. more than 80%, no uniform composition is obtained, and the resulting composition cannot be put to practical use. As shown in Comparative Examples 8-11, even if the volume percentage of the vulcanized rubber particles is less than 80%, the mechanical properties are not improved when neither of the rubber components contains the modified rubber.

EXAMPLES 18-21

Hundred parts of a chlorinated butyl rubber, 40 parts of FEF carbon black, 3 parts of zinc oxide, 4 parts of a methylolated alkylphenol formaldehyde resin, 0.6 part of dibenzothiazyl disulfide and 0.3 upart of sulfur were mixed with low-temperature rolls according to a formulation shown in Table 3 to prepare a rubber blend IV. Likewise, 100 parts of an epichlorohydrin homopolymer rubber or an epichlorohydrin-ethylene oxide copolymer rubber plus a modified epichlorohydrin homopolymer rubber was mixed with 40 parts of FEF carbon black by low-temperature rolls to prepare a rubber blend V. Further, the rubber blends IV and V were mixed with low-temperature rolls according to the formulation shown in Table 3 to prepare a rubber blend VI. The rubber blend VI was charged into a Brabender mixer set at 160° C., and dynamic vulcanization was performed at 100 rpm for 40 minutes. After the dynamically vulcanized blend was discharged from the Brabender mixer, it was mixed with magnesium oxide, 2,4,6-trimercapto-S-triazine and diphenylguanidine by low-temperature rolls according to the formulation shown in Table 3. After mixing was over, the resulting rubber composition was formed into a sheet. On that occasion, roll processability of the rubber composition was evaluated from surface smoothess of the sheet.

Thereafter, the sheet was press-vulcanized at 160° C. for 30 minutes, and the resulting vulcanizate was subjected to a tensile strength in accordance with JIS K 6301. The results are shown in Table 3.

COMPARATIVE EXAMPLES 12-16

Rubber compositions in Comparative Examples 12-16 were dynamically vulcanized in the same way as in Examples 18-21. The rubber composition in Comparative Example 12 was poor in roll processability and could not be formed into a sheet, so that the properties could not be evaluated. The rubber compositions in Comparative Examples 13-16 were press-vulcanized at 160° C. for 30 minutes, and properties of the resulting vulcanizates were evaluated. The results are shown in Table 3.

TABLE 3

| | | Examples | | | |
|---|---|---|---|---|---|
| | | 18 | 19 | 20 | 21 |
| Formulation (parts by weight) | Chlorinated butyl rubber (*2) | 65 | 50 | 20 | 50 |
| | Epichlorohydrin homopolymer rubber (*5) | 31.5 | 45 | 72 | |
| | Epichlorohydrin-ethylene oxide copolymer rubber (*13) | | | | 45 |
| | Modified epichlorohydrin homopolymer rubber (*12) | 3.5 | 5 | 8 | 5 |
| | FEF carbon black | 40 | 40 | 40 | 40 |
| | Zinc oxide | 1.95 | 1.5 | 0.6 | 1.5 |
| | Magnesium oxide | 1.05 | 1.5 | 2.4 | 1.5 |
| | 2,4,6-trimercapto-S—triazine | 0.39 | 0.55 | 0.88 | 0.60 |
| | Diphenylguanidine | 0.21 | 0.30 | 0.48 | |
| | Methylolated alkylphenol formaldehyde resin (*10) | 2.6 | 2.0 | 0.8 | 2.0 |
| | Dibenzothiazyl disulfide | 0.39 | 0.30 | 0.12 | 0.30 |
| | Sulfur | 0.20 | 0.15 | 0.06 | 0.15 |
| Ratio of crosslinked rubber particles (% by volume) | | 72.9 | 59.1 | 26.6 | 57.5 |
| Test results | Tensile tests | | | | |
| | Tensile strength (kg/cm$^2$) | 84 | 137 | 135 | 128 |
| | Elongation (%) | 240 | 380 | 390 | 350 |
| | 100% Stress (kg/cm$^2$) | 29 | 27 | 23 | 28 |
| | Hardness (JIS) | 65 | 64 | 62 | 65 |

TABLE 3-continued

| | | | | | | |
|---|---|---|---|---|---|---|
| | Roll processability of a composition (surface smoothness of a sheet) | slightly poor | good | good | good | |

| | | Comparative Examples | | | | |
|---|---|---|---|---|---|---|
| | | 12 | 13 | 14 | 15 | 16 |
| Formulation (parts by weight) | Chlorinated butyl rubber (*2) | 75 | 65 | 50 | 20 | 50 |
| | Epichlorohydrin homopolymer rubber (*5) | 22.5 | 35 | 50 | 80 | |
| | Epichlorohydrin-ethylene oxide copolymer rubber (*13) | | | | | 50 |
| | Modified epichlorohydrin homopolymer rubber (*12) | 2.5 | | | | |
| | FEF carbon black | 40 | 40 | 40 | 40 | 40 |
| | Zinc oxide | 2.25 | 1.95 | 1.5 | 0.6 | 1.5 |
| | Magnesium oxide | 0.75 | 1.05 | 1.5 | 2.4 | 1.5 |
| | 2,4,6-trimercapto-S—triazine | 0.28 | 0.39 | 0.55 | 0.88 | 0.60 |
| | Diphenylguanidine | 0.15 | 0.21 | 0.30 | 0.48 | |
| | Methylolated alkylphenol formaldehyde resin (*10) | 3.0 | 2.6 | 2.0 | 0.8 | 2.0 |
| | Dibenzothiazyl disulfide | 0.45 | 0.39 | 0.30 | 0.12 | 0.30 |
| | Sulfur | 0.23 | 0.20 | 0.15 | 0.06 | 0.15 |
| Ratio of crosslinked rubber particles (% by volume) | | 81.3 | 72.9 | 59.1 | 26.6 | 57.5 |
| Test results | Tensile tests | | | | | |
| | Tensile strength (kg/cm$^2$) | — | 41 | 80 | 97 | 82 |
| | Elongation (%) | — | 170 | 280 | 340 | 250 |
| | 100% Stress (kg/cm$^2$) | — | 25 | 24 | 23 | 26 |
| | Hardness (JIS) | — | 63 | 62 | 62 | 63 |
| | Roll processability of a composition (surface smoothness of a sheet) | incapable of forming a sheet | heavily poor | slightly poor | good | slightly poor |

(Note)
(*13) "GECHRON 2000": a tradname for a product made by Nippon Zeon Co., Ltd., having a specific gravity of 1.27 g/cm$^3$.

(Note)
(*13) "GECHRON 2000": a tradname for a product made by Nippon Zeon Co., Ltd., having a specific gravity of 1.27 g/cm$^3$.

Upon comparing Examples 18, 19, 20 & 21 with Comparative Examples 13, 14, 15 & 16, it follows that the rubber compositions of this invention have excellent tensile strength and elongation and improved processability.

As shown in Comparative Example 12, when the volume percentage of te dynamically vulcanized crosslinked rubber particles exceeds 80%, no uniform rubber composition is obtained, and the resulting composition cannot be put to practical use. As shown in Comparative Examples 13-16, even if the volume percentage of the crosslinked rubber particles is less than 80%, the mechanical properties are not improved when neither of the rubber components contains the modified rubber.

The results in Tables 2 and 3 reveal that the compositions of this invention with either the butyl rubber or the epichlorohydrin rubber dispersed as crosslinked rubber particles have also excellent tensile strength and elongation and improved processability.

What we claim is:

1. A rubber composition comprising
   (1) 10 to 90% by weight of at least one of a butyl rubber and a halogenated butyl rubber as a first rubber component, ad
   (2) 90 to 10% by weight of an epichlorohydrin rubber as a second rubber component,
   at least part of at least one of said rubbers (1) and (2) being modified with maleic anhydride or its derivative.

2. The rubber composition of claim 1 wherein the rubbers (1) and (2) modified with maleic anhydride or its derivative are contained in amounts of not less than 1% by weight based on the total weight of the rubber components.

3. The rubber composition of claim 1 wherein the rubbers (1) and (2) modified with maleic anhydride or its derivative contain not less than $1 \times 10^{-3}$ mol equivalent of carboxyl groups per 100 g of said rubbers.

4. The rubber composition of claim 1 wherein one of the first and second rubber components is contained as crosslinked rubber particles.

5. The rubber composition of claim 4 wherein the crosslinked rubber particles are formed by dynamic vulcanization.

* * * * *